(12) United States Patent
Ehman et al.

(10) Patent No.: US 12,059,850 B2
(45) Date of Patent: Aug. 13, 2024

(54) SYNTHETIC TURF JOINING SYSTEM WITH WATER CHANNEL AND METHOD OF JOINING SYNTHETIC TURF

(71) Applicant: Watershed Geosynthetics LLC, Alpharetta, GA (US)

(72) Inventors: S. Kyle Ehman, Milton, GA (US); William Delaney Lewis, Downsville, LA (US); Carl M. Davis, III, Canton, GA (US)

(73) Assignee: Watershed Geos ynthetics LLC, Alpharetta, GA (US)

( * ) Notice: Subject to any disclaimer, the term of this patent is extended or adjusted under 35 U.S.C. 154(b) by 0 days.

(21) Appl. No.: 17/921,007

(22) PCT Filed: Apr. 22, 2021

(86) PCT No.: PCT/US2021/028544
§ 371 (c)(1),
(2) Date: Oct. 24, 2022

(87) PCT Pub. No.: WO2021/216806
PCT Pub. Date: Oct. 28, 2021

(65) Prior Publication Data
US 2023/0256685 A1    Aug. 17, 2023

Related U.S. Application Data

(60) Provisional application No. 63/014,441, filed on Apr. 23, 2020.

(51) Int. Cl.
*E01C 13/08*    (2006.01)
*B29C 65/00*    (2006.01)
*B29C 65/20*    (2006.01)

(52) U.S. Cl.
CPC ............ *B29C 66/435* (2013.01); *B29C 65/20* (2013.01); *B29C 66/1122* (2013.01);
(Continued)

(58) Field of Classification Search
None
See application file for complete search history.

(56) References Cited

U.S. PATENT DOCUMENTS 8,403,597 B2   3/2013   Ayers
9,163,375 B2   10/2015  Ayers
(Continued)

FOREIGN PATENT DOCUMENTS

NL    2006851 C2    11/2012

OTHER PUBLICATIONS

WIPO, International Search Report, PCT/US21/28544, Jul. 21, 2021.
WIPO, Written Opinion, PCT/US21/28544, Jul. 21, 2021.

*Primary Examiner* — Alexander S Thomas
(74) *Attorney, Agent, or Firm* — Baker Donelson; Carl M. Davis II

(57) ABSTRACT

A turf joining system i ncluding a first piece and second piece of a synthetic turf and a bridge support. The first and second pieces have side edges which are closely adjacent each other. The bridge support heat welds to the overlying first and second pieces to form an elongated first heat weld and elongated second heat weld each proximate and spaced from the respective side edge to define a water channel therebetween. A method of sealing a plurality of synthetic turf pieces together is disclosed.

20 Claims, 1 Drawing Sheet

(52) U.S. Cl.
CPC .......... *B29C 66/1142* (2013.01); *B29C 66/71* (2013.01); *B29C 66/729* (2013.01); *B29C 66/73921* (2013.01); *B29C 66/8362* (2013.01); *E01C 13/08* (2013.01)

(56) References Cited

U.S. PATENT DOCUMENTS

| | | |
|---|---|---|
| 9,267,231 B2 | 2/2016 | Lewis |
| 9,587,364 B2 | 3/2017 | Ayers |
| 10,581,374 B2 | 3/2020 | Urrutia |
| 2004/0234719 A1* | 11/2004 | Jones ...................... E01C 13/08 |
| | | 156/304.4 |
| 2009/0169797 A1 | 7/2009 | Hayes, II |
| 2012/0186729 A1 | 2/2012 | O'Connor |

* cited by examiner

SYNTHETIC TURF JOINING SYSTEM WITH WATER CHANNEL AND METHOD OF JOINING SYNTHETIC TURF

TECHNICAL FIELD

The present invention relates to a joining strip for joining multiple pieces of synthetic turf together. More particularly, the present invention relates to multiple pieces of synthetic turf joined together by a bridge strip to define a flow channel for flow of seepage from ambient water flow over the ground cover and a method of joining synthetic turf pieces together for seepage flow channels, for a ground surface cover system of the synthetic turf.

BACKGROUND OF THE INVENTION

Today, large tracts of land may be cleared or otherwise exposed to the elements, such as for the use of solar energy generation sites, coal-fired power plants ash holding ponds, or landfill waste mounds. These areas are subject to closing with large covers such as geomembranes that restrict environmental waters, such as rain or other precipitation or surface water flow, from passing through the covered site and leaching into the ground or pond.

Many of these tracts of land are covered with a "tufted geosynthetics" or synthetic turf cover system to provide an aesthetically pleasing appearance as well as providing for a slowing of the water flow over the ground cover and restricting the ill- effects of wind over the ground cover. The synthetic turf is generally comprised of synthetic fibers tufted to a backing and a geomembrane. Examples of a tufted geosynthetic cover system are shown in Ayers and Urrutia U.S. Pat. Nos. 7,682,105 and 9,163,375.

With such large areas of ground to cover, the complete covering requires the joining together of many individual pieces or strips of synthetic turf. Typically, the pieces are unrolled from large rolls of synthetic turf in a downhill direction. The unrolled strips are then joined together by welding the side edges of adjacent pieces to each other, as shown in U.S. Pat No. 9,863,100. While this provides a solution, the joined areas or seams may have areas that are not completely sealed together due to the heat welding being applied to the tufted area, wherein the uneven or inconsistent tufts or blades become part of the weld. The incomplete seal may allow the intrusion of water through the seam and into the underlying ground and a weakening of the seam over time.

The strips of synthetic turf may also be joined together by gluing a strip of material along the edges of two adjoining pieces of synthetic turf, thus creating a chemical bond between the synthetic turf and the underlying strip. These chemical bonds may break down over time, especially when subjected to sun's ultraviolet light. Thus, the chemical bond is a temporary seal or bond that does not provide a permanent bond between the pieces of synthetic turf and the underlying, glued strip. As used herein, the term chemical bond is intended to represent a bond created chemically through an adhesive, while a mechanical bond is intended to represent a bond created by melting portions together so that the pieces co-mingle and become unitary upon cooling.

Accordingly, it is seen that a need remains for a synthetic turf joining system that provides a consistent seam and a method of achieving the joining of synthetic turf while providing a water channel for controlled flow of seepage from ambient water flowing over a ground cover of the synthetic turf covering a land site. It is to the provision of such therefore that the present invention is primarily directed.

BRIEF SUMMARY OF THE INVENTION

The present invention meets the need in the art by providing a turf joining system comprising a first piece of synthetic turf having a side edge and a second piece of synthetic turf having a side edge, with a bridge support of a material that readily melts and bonds to a bottom surface of the respective first piece and second piece of synthetic turf, said bridge support positioned directly below said first piece side edge and said second piece side edge, and an elongated first heat seal mechanically bonding said first piece of synthetic turf to said bridge support, said first elongated heat seal being spaced laterally from said side edge of said first piece of synthetic turf and an elongated second heat seal mechanically bonding said second piece of synthetic turf to said bridge support, said second elongated heat seal being spaced laterally from said side edge of said second piece of synthetic turf, said first heat seal and said second heat seal defining an elongated water channel therebetween below the first and second pieces of elongated synthetic turf for drainage of environmental ambient water from an upper surface thereof.

In yet another aspect, the present invention provides a ground cover comprising a first piece and a second piece of a synthetic turf each having a side edge, said synthetic turf having a woven backing and a plurality of yarns tufted therein as simulated blades of grass extending from a surface. A bridge support of a material that readily melts and bonds to the woven backing of the respective first piece and second piece of synthetic turf, said bridge support positioned directly below opposing edge portions of the respective side edges of the first piece and second piece positioned in adjacent relation; and an elongated first heat seal bonding said first piece of synthetic turf to said bridge support, said first elongated heat seal being spaced laterally from said side edge of said first piece of synthetic turf and an elongated second heat seal mechanically bonding said second piece of synthetic turf to said bridge support, said second elongated heat seal being spaced laterally from said side edge of said second piece of synthetic turf, and said first heat seal and said second heat seal with said bridge support defining an elongated water channel therebetween below the first piece and second piece of synthetic turf for drainage of environmental ambient water from an upper surface thereof.

In yet another aspect, the present invention provides a method of sealing a plurality of synthetic turf pieces together, the method comprising the steps of:
  (a) providing a first piece of synthetic turf having an elongated side edge;
  (b) providing a second piece of synthetic turf having an elongated side edge;
  (c) providing an elongated bridge support of a material that readily melts and bonds to a bottom surface of the respective first piece and second piece of synthetic turf;
  (d) heat sealing the first piece of synthetic turf to the bridge support laterally of the side edge thereof to create an elongated first seal along the length of the side edge of the first piece of synthetic turf, and
  (e) heat sealing the second piece of synthetic turf to the bridge support laterally of the side edge thereof to create an elongated second seal along the length of the side edge of the second piece of synthetic turf, whereby the elongated first seal and the elongated second seal with the bridge support defines a water channel therebetween below the first piece and second piece of synthetic turf for drainage of environmental ambient water from an upper surface thereof.

The objects, features, and advantages of the present invention will be readily apparent upon a reading of the following detailed description in reference to the drawings.

BRIEF DESCRIPTION OF THE DRAWINGS

In order that the manner in which the present inventions can be better understood, certain illustrations, charts and/or flow charts are appended hereto. It is to be noted, however, that the drawings illustrate only selected embodiments of the inventions and are therefore not to be considered limiting of scope, for the inventions may admit to other equally effective embodiments and applications.

DETAILED DESCRIPTION

Figure 1:
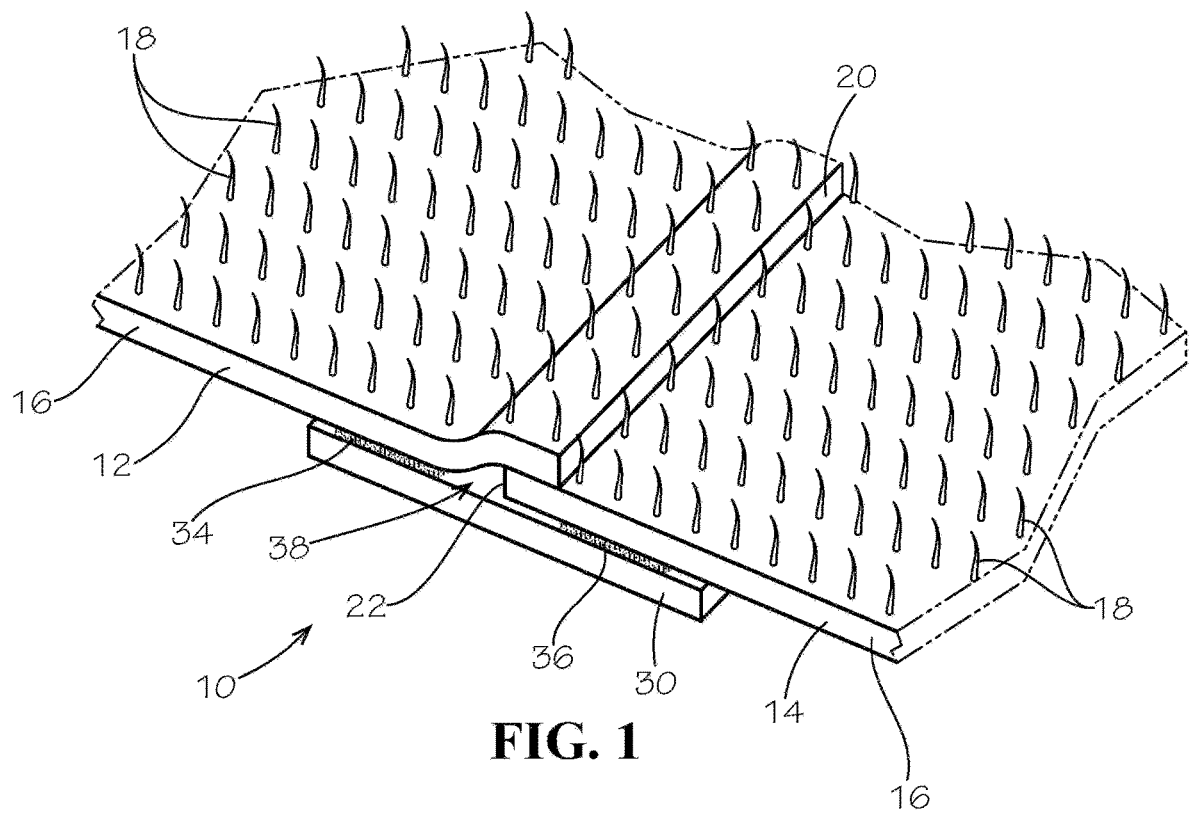
FIG. 1 is a perspective view of a synthetic turf joining system embodying principles of the invention, shown with overlapping pieces of synthetic turf
Figure 2:
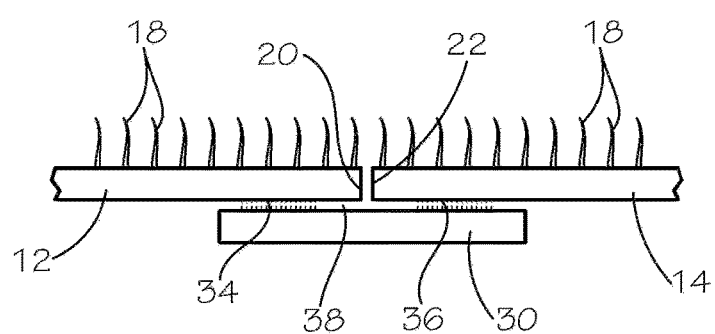
FIG. 2 is an end view of a synthetic turf joining system embodying principles of the invention, shown with pieces of synthetic turf join in abutment.

With reference next to the drawings, there is a shown in FIG. 1 a synthetic turf joining system 10 in a preferred form of the present invention for covering a ground site generally 11. The turf joining system 10 includes a first portion, section, strip, or piece 12 of synthetic turf and an adjacent second portion, section, strip, or piece 14 of synthetic turf. The first and second pieces 12 and 14 are made of a polypropylene base layer 16 and a plurality or field of tufted fibers or yarn 18 made of a polyethylene material. The base layer 16 of the first and second pieces 12 and 14 may comprise a woven elongated textile sheet having a width and length and tufted with yarns to provide elongated blade-like simulated grass tufts extending from a surface of the sheet. The first and second pieces 12 and 14 are generally aligned upon installation for covering a ground surface so that their adjacent side edges 20 and 22, respectively, are parallel and closely adjacent each other. The side edges may slightly overlap, as shown in FIG. 1, or be in abutment, or close proximity, with each other, as shown in FIG. 2.

The turf joining system 10 also includes a bridge portion or support 30 positioned below the first and second pieces adjacent side edges 20 and 22. The bridge support 30 may be made of a polymer material that is of the same polymer material as the bottom surface of the synthetic turf base layer 16, such as a polypropylene material. The base layer 16 and bridge support 30 may be made of other polymer materials, such as polyethylene, so long as the materials are the same to allow melting and bonding of the two components.

The bridge support 30 is heat welded to the overlying bottom surfaces of the first and second pieces 12 and 14. The first piece 12 is heat welded to the bridge support 30 along an elongated first heat weld 34 extending generally parallel to but spaced a short distance from the side edge 20 of the first piece 12. The second piece 14 is heat welded to the bridge support 30 along an elongated second heat weld 36 extending generally parallel to but spaced a short distance from the side edge 22 of the second piece 14. The first heat weld 34 is generally parallel to and spaced from the second heat weld 36 to define a space or non-bonded area that forms a water channel 38 therebetween.

In use, the turf joining system 10 is comprised of the several pieces of synthetic turf such as pieces 12, 14, which are joined to each other, so that the resulting assembled ground cover may be utilized, in situ, to cover a large area of ground, and particularly for covering a sloping ground as may be found at landfill or waste site facilities, subject to ambient environmental water flow from precipitation events. The drawings show only two pieces of synthetic turf, 12 and 14, being joined to each other; however, it should be understood that many more pieces may be joined in similar fashion longitudinally and laterally for covering an extensive surface area of ground 11.

The turf joining system 10 is formed by first heat welding the first piece 12 of synthetic turf to the elongated bridge support 30 along the first heat weld 34. The heat welding process may be accomplished by using a conventional heat welder, such as a Pro-wedge model VM-20 made by Demtech Services, Inc. of Diamond Springs, CA. The heat welder is moved along the side edge 20 of the first piece 12 with the side edge 20 extending over the heating plate of the heat welder and the bridge support 30 extending beneath the heating plate of the heat welder. The heating plate heats the contacting bottom surface of an elongated strip or section of the first piece 12 and an elongated strip or section of the top surface of the bridge support 30 to their melting point. The first piece 12 and bridge support 30 are then brought into contact with each other and pressed together between two contact rollers of the heat welder, thereby forming the elongated and continuous first heat weld 34 between the first piece 12 and bridge support 30. The first heat weld 34 forms a mechanical bond that is generally parallel with the side edge 20 but spaced a short distance from the side edge 20.

Next, the heat welder is moved along the side edge 22 of the second piece 12 with the side edge 22 extending over the heating plate of the heat welder and the bridge support 30 extending beneath the heating plate of the heat welder. The heating plate heats the contacting bottom surface of an elongated strip or section of the second piece 14 and an elongated strip or section of the top surface of the bridge support 30 to their melting point. The second piece 14 and bridge support 30 are then brought into contact with each other and pressed together between two contact rollers of the heat welder, thereby forming the elongated and continuous second heat weld 36 between the second piece 12 and bridge support 30. The second heat weld 36 forms a mechanical bond that is generally parallel with the side edge 22 but spaced a short distance from the side edge 22. The second heat weld 36 is also generally parallel to the first heat weld 34 and spaced from the first heat weld 34 to form the water channel 38 therebetween It should be noted that the preferred method of joining the pieces of synthetic turf together is to extend the longitudinal length of the pieces generally along the incline of any grade, i.e., the longitudinal side edges 20 and 22, and thus the water channel 38 runs in a direction up and down the hill, i.e., along the direction of the incline of the hill. With the formation of the water channel 38 between the first and second heat welds 34 and 36, any water seeping between the side edge 20 of the first piece 12 and the side edge 22 of the second piece 14 is gravitationally channeled downhill until is escapes at a lowermost opening or bottom of the water channel 38. This channeling of the water restricts the water from seeping through the ground covering into the ground below should there be an imperfection in the heat welds 34 and 36.

The adjoined pieces of synthetic turf 12, 14 thereby form the ground cover installed at the land site. The land site is subject to water flow from ambient precipitation such as rain or snow. The water flows over the ground cover that restricts flow into the ground below. Seepage of ambient water between the adjacent pieces however enters the water channel 38 between the upper surface of the bridge 30 and the opposing first and second heat welds 34, 36. The water flows in the water channel 38 between the first and second heat welds 34 and 36, gravitationally channeled downhill until it escapes from the water channel 38, for example, at a lower portion of the ground cover or a bottom opening to a culvert or water channel for conveying surface water to treatment and discharge into water bodies such as streams, rivers, or lakes. This channeling of the water restricts the water from seeping through the ground covering into the ground below.

As a variation of the just described embodiment, the bridge support 30 may be heat welded along its entirety, rather than forming two spaced apart heat welds. However, this is not preferred as it does not form the water channel 38.

In a first aspect, a combined assembly of synthetic turf pieces joined by bridges is manufactured for use in overlying a ground surface. The bridge support 30 attaches to the side portion proximate the side edge 20 of the first piece 12 of synthetic turf and a portion of the bridge support 30 extends laterally from the side edge. The second piece 14 of synthetic turf is placed with its side portion proximate the side edge 22 overlying the lateral portion of the bridge 30 with the side edge 22 abutting the side edge 20 or slightly overlying the portion of the first piece 12 proximate the side edge 20. The bridge 30 and the second piece 14 then heat weld together as discussed above and thereby define the water channel 38. The assembly process may continue with attaching of another piece of synthetic turf for ground coverage lateral of a side of the joined first piece 12 and second piece 14. For example, the process continues with attaching of another bridge 30 to the side edge 20 of the second piece 14. A portion of the another bridge extends laterally from the side edge 20 of the second piece 14. Another piece of synthetic turf is placed with its side portion proximate its side edge 22 thereof overlying the lateral portion of the another bridge with the side edge 22 abutting the side edge 20 or slightly overlying the side portion proximate the side edge 20 of the second piece 14. The subsequently placed another piece of synthetic turf weldingly attaches to the lateral portion of the another bridge.

In a second aspect, the assembly of the three joined pieces of synthetic turf as referenced above has another bridge 30 attached to the opposing side portion proximate the side edge 22 of the first piece 12 of synthetic turf. A portion of the bridge extends laterally as a free portion. The assembly then is rolled for transport to a site for covering a ground surface. At the site, an additional piece of synthetic turf may be attached to the free laterally extending portion of the bridge, and subsequent pieces of synthetic turf may be attached for covering the ground site.

In another aspect, the first piece 12 of synthetic turf is positioned on the ground surface, for example, as a rolled cylinder, and then unrolled down-slope to cover a portion of the ground surface. The elongated strip of the bridge is unrolled next to the side edge 20 of the first piece 12 of synthetic turf, and moved laterally to extend a portion of the bridge under the side portion of the first piece 12 of synthetic turf proximate the side edge 20. A portion of the bridge extends laterally from the side edge 20 freely. The bridge and the first piece 12 weldingly attach along the first weld line 34. The second piece 14 of synthetic turf is placed with its side portion proximate the side edge 22 overlying the free lateral portion of the bridge with the side edge 22 abutting the side edge 20 or slightly overlying the portion of the first piece 12 proximate the side edge 20. The bridge and the second piece 14 weldingly attach along the weld line 36 and thereby define the water channel 38 therealong. Additional pieces of synthetic turf may be selectively attached to respective side edge portions of the joined pieces of synthetic turf for ground covering purposes with attachment of another bridge to the joined piece and attachment of the additional piece.

In an alternate embodiment, the additional piece of synthetic turf includes an attached bridge joined on a weld line with a portion of the bridge extending laterally. The additional piece of synthetic turf is positioned proximately abutting the placed synthetic turf so that the free portion of the bridge overlaps the placed synthetic turf with opposing side edges 20, 22 of the placed and the additional piece of synthetic turf juxtaposed adjacently. The additional piece is unrolled down-slope. The portion of the placed synthetic turf proximate its side edge 20 is lifted to allow the free lateral portion of the bridge to position below the placed synthetic turf. The bridge and the placed synthetic turf then weldingly join along the first weld line 34.

In another aspect, the bridges 30 and a plurality of pieces 12, 14 of synthetic turf are positioned and joined during an on-site assembly process. The following describes installation and attachment on a slope from left to right. A first bridge 30 is unrolled down-slope. The piece 12 of synthetic turf is positioned on the ground with the side edge 22 on an intermediate longitudinal line between the opposing edges of the bridge. The piece 12 of synthetic turf then unrolls down-slope with its side portion proximate the side edge 22 overlying the portion of the bridge lateral of the longitudinal line. The bridge 30 and the then-placed piece 12 of synthetic turf then weldingly join along the weld line 36. A second bridge 30 is unrolled down-slope along a line spaced apart from the side edge 20 of the placed piece 12 of synthetic turf. The second bridge 30 is spaced based on the width of the pieces of synthetic turf. In this way, the piece 14 of synthetic turf has opposing side portions that overlie respective portions of the two spaced-apart bridges. The side edge 22 of the piece 14 of synthetic turf may abut or overlap the side edge 20 of the first placed piece of synthetic turf. The side portion proximate the side edge 22 of the piece 14 of synthetic turf weldingly attaches to the bridge 30 and thereby defines the water channel 38 thereat. Then, the opposing side portion proximate the side edge 20 of the piece 14 of synthetic turf weldingly attaches to the second bridge. It may be necessary to manually move the bridge relative to the side edge 20. Subsequent pieces of synthetic turf and bridges are similarly spaced and attached for ground cover installation.

The assembly of adjacent pieces of synthetic turf 12, 14 and bridges 30 thereby form the ground cover with water channels 38 installed for overlying the ground 11 at the land site. The land site is subject to water flow from ambient precipitation such as rain or snow. The water flows over the ground cover that restricts flow into the ground below. Seepage of ambient water between the adjacent pieces however enters the water channel 38 between the upper surface of the bridge 30 and the opposing first and second heat welds 34, 36. The water flows in the water channel 38 between the first and second heat welds 34 and 36, gravitationally channeled downhill until it escapes from the water channel 38, for example, at a lower portion of the ground cover or a bottom opening, such as into a culvert or water channel for conveying surface water to treatment and discharge into water bodies such as streams, rivers, or lakes.

This channeling of the water restricts the water from seeping through the ground covering into the ground below.

Variations of the turf joining system fall within the spirit of the claims, below. It will be appreciated that the inventions are susceptible to modification, variation, and change without departing from the spirit thereof.

What is claimed is:

1. A turf joining system comprising:
   a first piece of synthetic turf having a side edge;
   a second piece of synthetic turf having a side edge;
   a bridge support of a material that readily melts and bonds to a bottom surface of the respective first piece and second piece of synthetic turf, said bridge support positioned directly below said first piece side edge and said second piece side edge, and
   an elongated first heat seal mechanically bonding said first piece of synthetic turf to said bridge support, said first elongated heat seal being spaced laterally from said side edge of said first piece of synthetic turf;
   an elongated second heat seal mechanically bonding said second piece of synthetic turf to said bridge support, said second elongated heat seal being spaced laterally from said side edge of said second piece of synthetic turf, and
   said first heat seal and said second heat seal defining an elongated water channel therebetween below the first and second pieces of elongated synthetic turf for drainage of environmental ambient water from an upper surface thereof.

2. The turf joining system as recited in claim 1, wherein the synthetic turf comprises an elongated textile sheet tufted with yarns to provide a plurality of spaced-apart simulated grass blades extending from a surface.

3. The turf joining system as recited in claim 2, wherein the textile sheet comprises a sheet woven with polymeric yarns.

4. The turf joining system as recited in claim 3, wherein the polymeric yarns are polypropylene.

5. The turf joining system as recited in claim 2, wherein the polymeric material for the bridge support comprises the same material for the textile sheet.

6. The turf joining system as recited in claim 2, wherein the bridge support comprises a polymeric material that melts and bonds to the textile sheet.

7. The turf joining system as recited in claim 1, wherein the bridge support comprises an elongated strip of a polymeric material.

8. A ground cover comprising:
   a first piece and a second piece of a synthetic turf each having a side edge, said synthetic turf having a woven backing and a plurality of yarns tufted therein as simulated blades of grass extending from a surface;
   a bridge support of a material that readily melts and bonds to the woven backing of the respective first piece and second piece of synthetic turf, said bridge support positioned directly below opposing edge portions of the respective side edges of the first piece and second piece positioned in adjacent relation; and
   an elongated first heat seal bonding said first piece of synthetic turf to said bridge support, said first elongated heat seal being spaced laterally from said side edge of said first piece of synthetic turf;
   an elongated second heat seal mechanically bonding said second piece of synthetic turf to said bridge support, said second elongated heat seal being spaced laterally from said side edge of said second piece of synthetic turf, and
   said first heat seal and said second heat seal with said bridge support defining an elongated water channel therebetween below the first piece and second piece of synthetic turf for drainage of environmental ambient water from an upper surface thereof.

9. The ground cover as recited in claim 8, wherein the woven backing comprises a sheet woven with polymeric yarns.

10. The ground cover as recited in claim 9, wherein the polymeric yarns are polypropylene.

11. The ground cover as recited in claim 8, wherein the bridge support comprises an elongated strip of a polymeric material.

12. The ground cover as recited in claim 8, wherein the polymeric material for the bridge support comprises the same material for the woven backing.

13. The ground cover as recited in claim 8, wherein the bridge support comprises a polymeric material that melts and bonds to the woven backing.

14. A method of sealing a plurality of synthetic turf pieces together, the method comprising the steps of:
   (a) providing a first piece of synthetic turf having an elongated side edge;
   (b) providing a second piece of synthetic turf having an elongated side edge;
   (c) providing an elongated bridge support of a material that readily melts and bonds to a bottom surface of the respective first piece and second piece of synthetic turf;
   (d) heat sealing the first piece of synthetic turf to the bridge support laterally of the side edge thereof to create an elongated first seal along the length of the side edge of the first piece of synthetic turf, and
   (e) heat sealing the second piece of synthetic turf to the bridge support laterally of the side edge thereof to create an elongated second seal along the length of the side edge of the second piece of synthetic turf,
   whereby the elongated first seal and the elongated second seal with the bridge support defines a water channel therebetween below the first piece and second piece of synthetic turf for drainage of environmental ambient water from an upper surface thereof.

15. The method of sealing a plurality of synthetic turf pieces together as recited in claim 14, wherein the synthetic turf provided in steps (a) and (b) each comprise an elongated textile sheet tufted with yarns to provide a plurality of spaced-apart simulated grass blades extending from a surface.

16. The method of sealing a plurality of synthetic turf pieces together as recited in claim 15, wherein the textile sheet comprises a sheet woven with polymeric yarns.

17. The method of sealing a plurality of synthetic turf pieces together as recited in claim 16, wherein the polymeric yarns are polypropylene.

18. The method of sealing a plurality of synthetic turf pieces together as recited in claim 15, wherein the polymeric material for the bridge support comprises the same material for the textile sheet.

19. The method of sealing a plurality of synthetic turf pieces together as recited in claim 15, wherein the bridge support comprises a polymeric material that melts and bonds to the textile sheet.

20. The method of sealing a plurality of synthetic turf pieces together as recited in claim 14, wherein the bridge support provided in step (c) comprises an elongated strip of a polymeric material.

* * * * *